United States Patent [19]

Shieh

[11] Patent Number: 5,785,289

[45] Date of Patent: Jul. 28, 1998

[54] HOLDER FOR A BICYCLE CABLE LOCK

[76] Inventor: Jin-Ren Shieh, No. 178 Shih Chia Rd., Taichung, Taiwan

[21] Appl. No.: 752,063

[22] Filed: Nov. 19, 1996

[51] Int. Cl.⁶ ............................................. F16B 1/00
[52] U.S. Cl. .................. 248/230.1; 70/233; 70/18; 70/49
[58] Field of Search ............... 248/230.1, 231.2, 248/231.3, 231.5, 316.1, 218.4; 70/233, 18, 49, 14, 19

[56] References Cited

U.S. PATENT DOCUMENTS

| | | | |
|---|---|---|---|
| 567,157 | 9/1896 | Noyes | 248/231.51 |
| 1,200,850 | 10/1916 | Kawasaki | 248/316.1 |
| 1,778,568 | 10/1930 | Schulte | 248/231.21 |
| 2,392,932 | 1/1946 | Macbeth | 248/230.1 |
| 4,028,916 | 6/1977 | Pander | 70/233 |
| 4,126,024 | 11/1978 | Timmons et al. | 70/233 |
| 5,291,765 | 3/1994 | Hoisington | 70/233 |
| 5,622,345 | 4/1997 | Hopkins | 248/231.51 |
| 5,706,679 | 1/1998 | Zane et al. | 70/18 |

Primary Examiner—Leslie A. Braun
Assistant Examiner—Kimberly T. Wood
Attorney, Agent, or Firm—Connolly & Hutz

[57] ABSTRACT

The present invention relates to an improved holder for a bicycle cable lock, comprising a clamping ring, a U-shaped bar, which extends away from the clamping ring, and a button on the far end of the U-shaped bar. The clamping ring is mountable on the frame of the bicycle, e.g., on the vertical frame bar below the saddle, the crossbar or the handlebar. The button fits into the lock head of the cable lock, thereby the cable lock, when not in use is securely fastened and will not fall down or interfere with the moving bicycle.

2 Claims, 3 Drawing Sheets

HOLDER FOR A BICYCLE CABLE LOCK

BACKGROUND OF THE INVENTION

1. Field of the Invention

The present invention relates to an improved holder for a bicycle cable lock, particularly a holder, wherein a tube-like clamp extends into a U-shaped bar, to which a button is attached, such that the cable lock is stably positioned and will not fall down.

2. Description of Related Art

A conventional cable lock 10 for a bicycle, as shown in FIG. 1, comprises an elastic rolled-up cable 14, which ends in a cable button 13, with a narrower neck part 131 in between. On the other end of the cable 14 a lock head 15 is mounted. The lock head 15 has a button hole 11 and a key hole 12. When the cable is used for locking the bicycle, the cable button 13 is inserted into the button hole 11 on the lock head 15. When the bicycle is moving, the cable 14 with the lock head 15, since they are not in a fixed position, easily interfere with the moving parts of the bicycle. Holders for bicycle cable locks have been brought onto the market, wherein the cable lock is inserted into a notch. However, when the bicycle moves, vibrations may cause the cable to loosen and the lock head to fall down. So there is still a considerable need for an improvement.

SUMMARY OF THE INVENTION

It is therefore the main object of the present invention to provide an improved holder for a bicycle cable lock, wherein a tube-like clamp extends into a U-shaped bar, to which a button is attached. The clamp is fastened to the vertical frame bar of the bicycle below the saddle, the crossbar, or the handlebar. The button is inserted into the button hole of the lock head, such that, when the bicycle moves, the lock head is securely fastened and the cable will not interfere.

The present invention can be more fully understood by reference to the following description and accompanying drawings.

DETAILED DESCRIPTION OF THE PREFERRED EMBODIMENT

Figure 1:
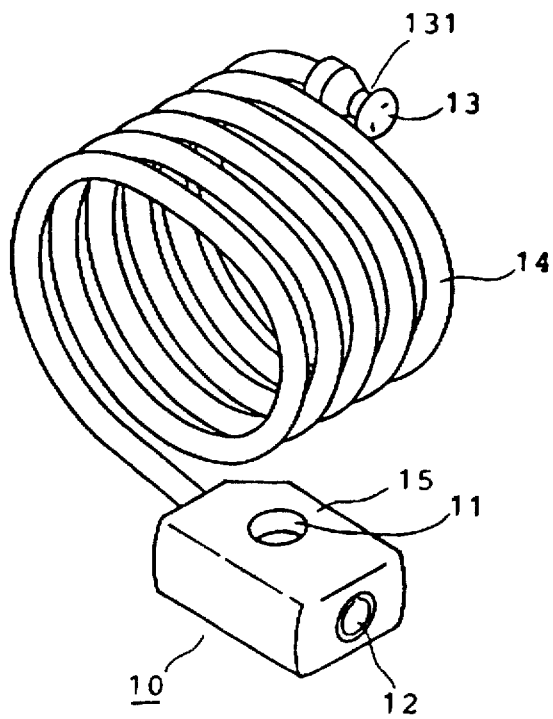
FIG. 1 is a perspective view of a conventional bicycle case lock.
Figure 2:
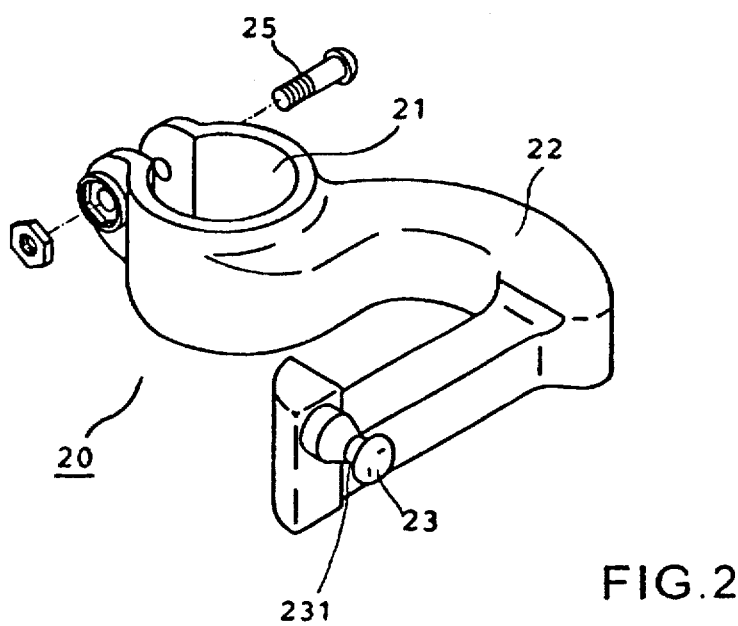
FIG. 2 is a perspective view of the holder for a bicycle cable lock of the present invention.
Figure 3:
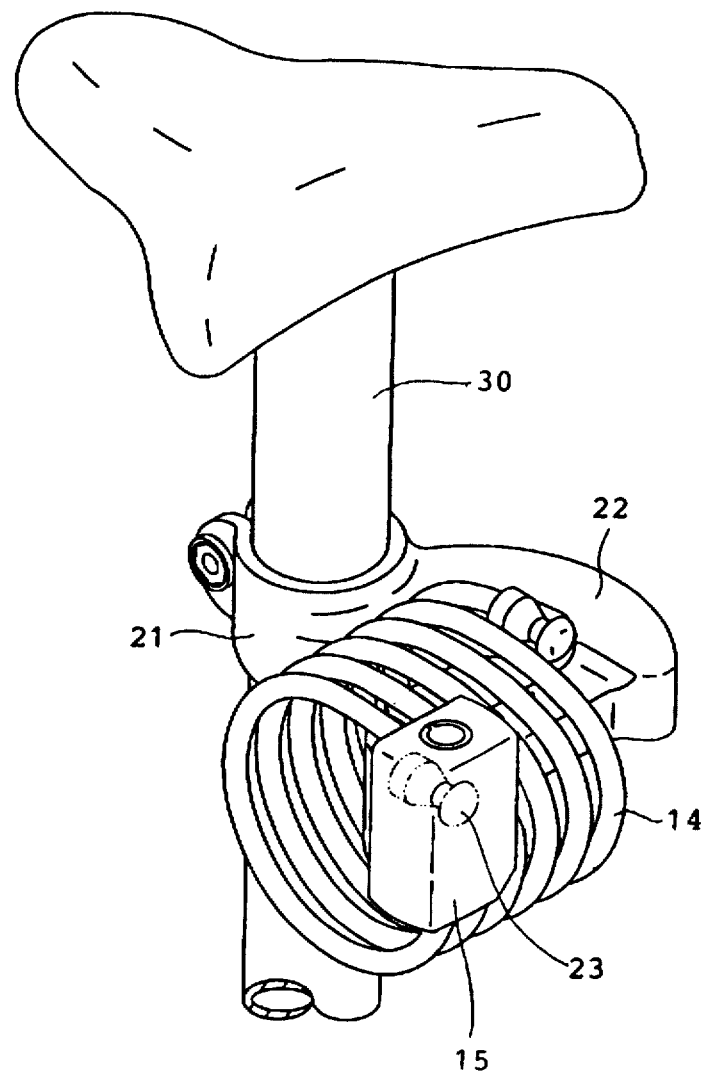
FIG. 3 is a schematic illustration of the holder for a bicycle cable lock of the present invention, as mounted on the vertical frame bar below the saddle of the bicycle.

Referring to FIG. 2 and 3, the holder for a bicycle cable lock 20 of the present invention comprises a clamping ring 21, which extends into a U-shaped bar 22, and a button 23 on the end of the U-shaped bar 22. The button is, closer to the U-shaped bar 22, a neck part 231, which is narrower than the end of the button 23. The clamping ring 21 is by a bolt 25 fastened to the vertical frame bar 30 below the saddle of the bicycle. The button 23 fits into the button hole 11 of the lock head 15. Thereby the lock head 15 is fastened to the holder 20, such that the lock head 15 will not fall down, when the bicycle is moving. The U-shaped bar 22 is surrounded by the cable 14. Therefore, the cable lock is held securely.

Figure 4:
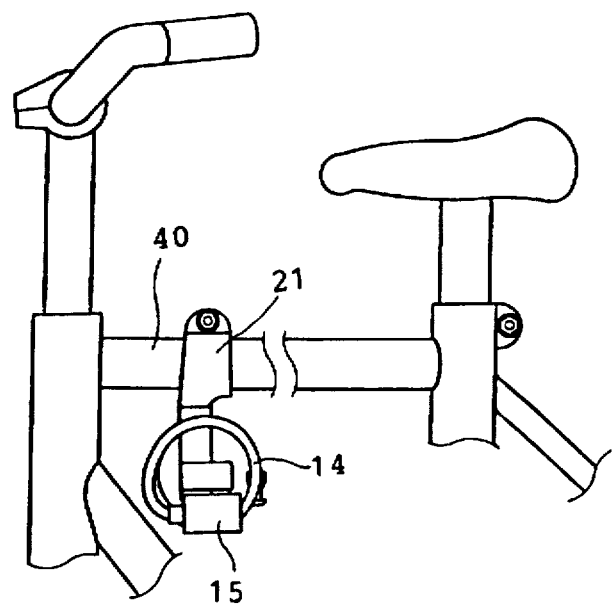
FIG. 4 is a schematic illustration of the holder for a bicycle cable lock of the present invention, as mounted on the crossbar of the bicycle.
Figure 5:
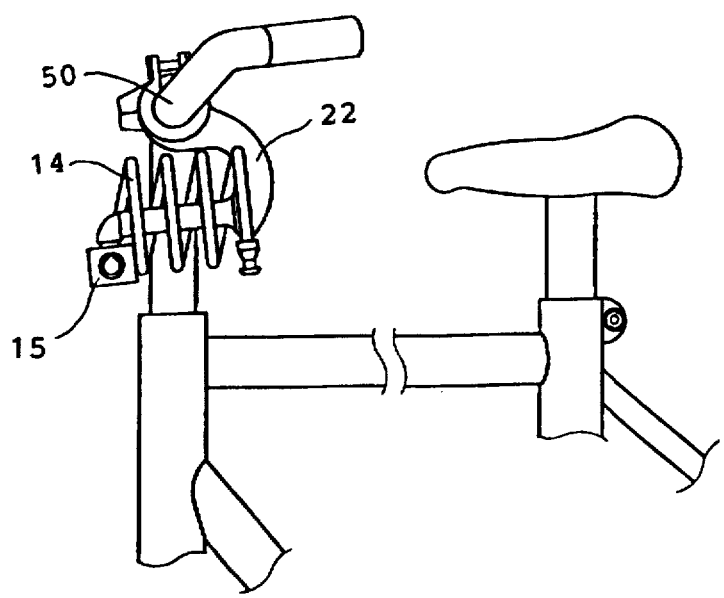
FIG. 5 is a schematic illustration of the holder for a bicycle cable lock of the present invention, as mounted on the handlebar of the bicycle.

Referring to FIG. 4 and 5, the holder for a bicycle cable lock 20 of the present invention is also mountable on the crossbar 40 or handlebar 50 of a bicycle. Therein, not only the lock head 15 is securely fastened to the button 23 of the holder 20, but also the cable 14 is wound around the U-shaped bar 22. So, thus secured, the cable lock 10 will not fall down or interfere with the movement of the bicycle.

What is claimed is:

1. A cable lock holder assembly for a bicycle, said cable lock holder assembly comprising:

a) a U-shaped bar including a first end having a clamping ring for securing to the bicycle and including a second end having a first button, b) a cable including a first end having a lock head secured to said cable and including a second end having a second button, said lock head including a button hole for engaging with said second button of said cable and for allowing said cable to lock the bicycle, said button hole of said lock head being engaged with said first button, when said second button of said cable is disengaged from said button hole of said lock head, for allowing said lock head and said cable to be secured to said U-shaped bar and for allowing said cable and said lock head to be solidly secured to the bicycle.

2. The cable lock holder assembly according to claim 1, wherein said first button of said U-shaped bar includes a narrow neck part.

\* \* \* \* \*